Figure 3:
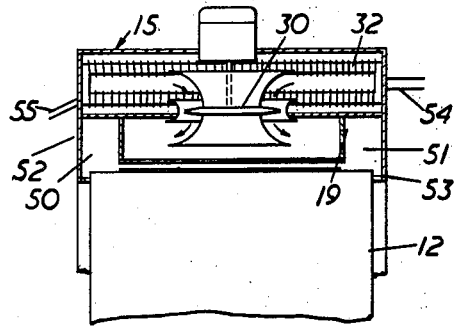

Feb. 26, 1963 R. COAR 3,078,592
APPARATUS FOR TREATING MOVING LENGTHS OF MATERIAL
Filed Aug. 25, 1959 4 Sheets-Sheet 1
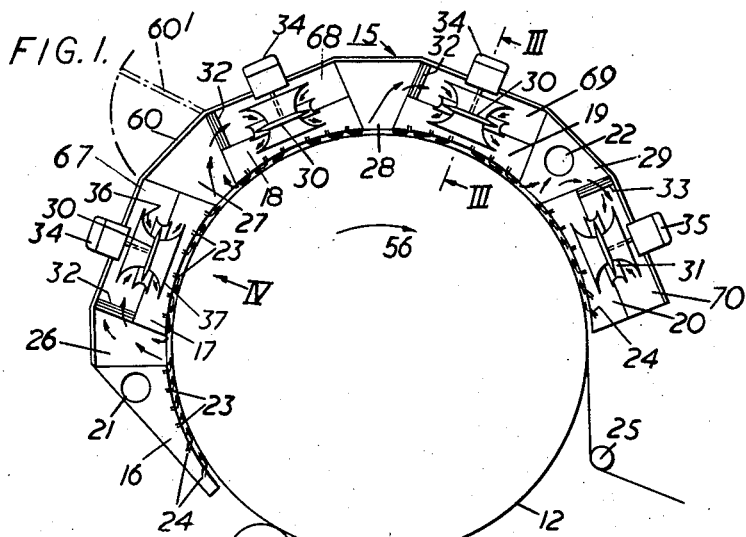
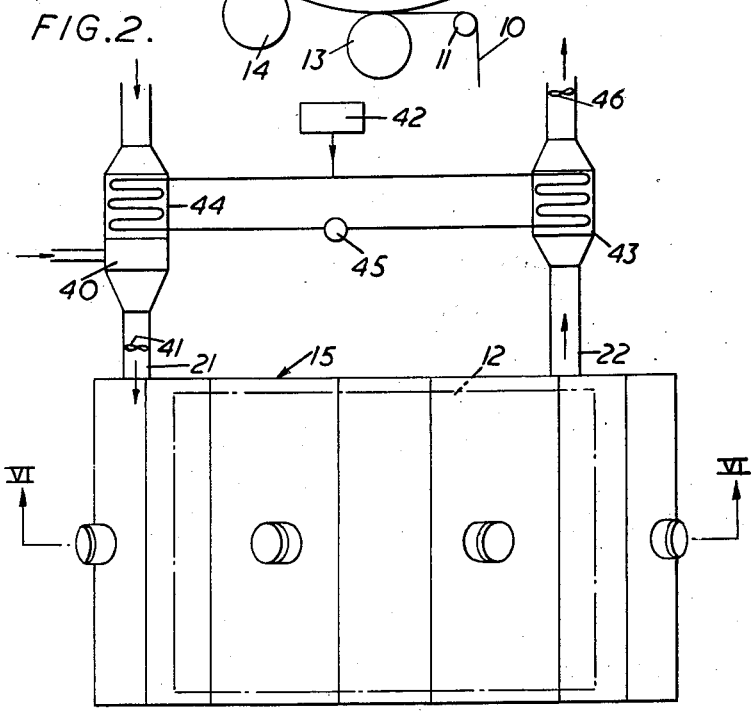
INVENTOR
Ronald Coar
BY
Mead, Browne, Schuyler & Beveridge
ATTORNEY Feb. 26, 1963 R. COAR 3,078,592
APPARATUS FOR TREATING MOVING LENGTHS OF MATERIAL
Filed Aug. 25, 1959 4 Sheets-Sheet 2

INVENTOR
Ronald Coar
BY
Mead, Browne, Schuyler & Beveridge
ATTORNEYS

Feb. 26, 1963 R. COAR 3,078,592
APPARATUS FOR TREATING MOVING LENGTHS OF MATERIAL
Filed Aug. 25, 1959 4 Sheets-Sheet 4
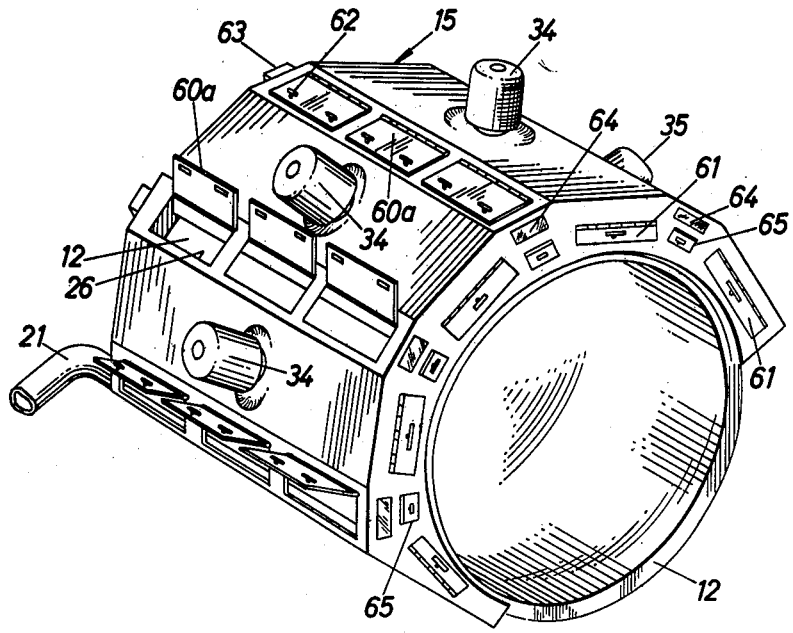
—FIG. 5.—
INVENTOR
Ronald Coar
BY
Mead, Browne, Schuyler & Browne
ATTORNEYS United States Patent Office 3,078,592
Patented Feb. 26, 1963

1

3,078,592
APPARATUS FOR TREATING MOVING
LENGTHS OF MATERIAL
Ronald Coar, Ilkley, England, assignor to The Spooner
Dryer & Engineering Co. Limited, Yorkshire, England
Filed Aug. 25, 1959, Ser. No. 835,967
Claims priority, application Great Britain Aug. 30, 1958
24 Claims. (Cl. 34—122)

The invention relates to treatment of materials and more particularly to apparatus for heating a moving length of material. The present invention is particularly applicable to the drying of paper on a cylinder for the production of either glazed or unglazed paper.

Apparatus is known for making machine glazed or unglazed paper in which a plurality of heating units are circumferentially arranged around part of the periphery of a machine glazing cylinder. Each of these heating units comprises a pressure chamber having, in its face which is adjacent the outer surface of the cylinder, a plurality of nozzles for projecting high velocity streams of heated gaseous medium on to material around the surface of the cylinder. Suction holes are arranged between the nozzles and a fan is provided in each unit for blowing heated gaseous medium into the pressure chamber, which medium has previously been withdrawn from the suction holes. The heated gaseous medium is thus circulated through a substantially enclosed endless path and a heater is provided in each heating unit in this path for heating the gaseous medium so circulated.

A disadvantage of this known type of apparatus is that, when a break occurs in the paper being heated, paper tends to be drawn through the suction holes and into the fan. Also, the paper may pile up underneath the drying units and form a solid mass which may even stop the cylinder rotating and cause considerable damage to the apparatus apart from the danger to personnel operating the apparatus.

Another disadvantage of this known apparatus is its bulkiness and therefore its high cost and also the difficulty of removing paper which is jammed between the drying units and the cylinder and which has been drawn into the drying units. Moreover a considerable amount of ducting is required for distributing make-up air to and removing exhaust air and vapour from each heating unit.

An object of the present invention is to provide, for material treatment apparatus including a rotatable treatment cylinder about which is passed a length of material to be treated, a hood-like structure which includes a minimum amount of ducting.

Another object of the present invention is to provide a hood-like structure in which the risk of paper piling up beneath the pressure chambers is reduced to a minimum.

A further object of the present invention is to provide exhaust spaces between the pressure chambers in which material, which may become broken or torn during operation, can readily collect so as to minimise the risk of a pile up beneath the pressure chambers and consequent damage to the hood-like structure.

A still further object of the present invention is to provide ready access to the exhaust spaces to enable any torn or broken material to be quickly removed so as to reduce to a minimum the shut down period before the apparatus is restarted.

2

Still further objects of the present invention will be apparent from the following detailed description when read in conjunction with the accompanying drawings.

Figure 4:
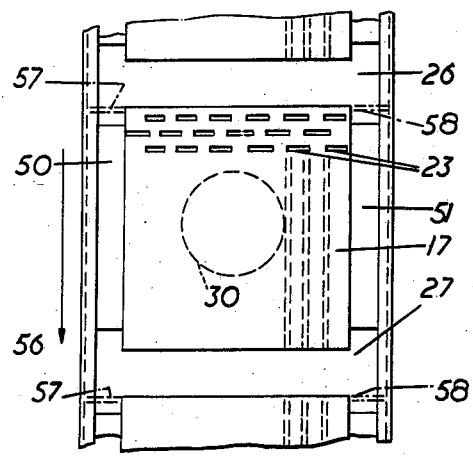
Figure 6:
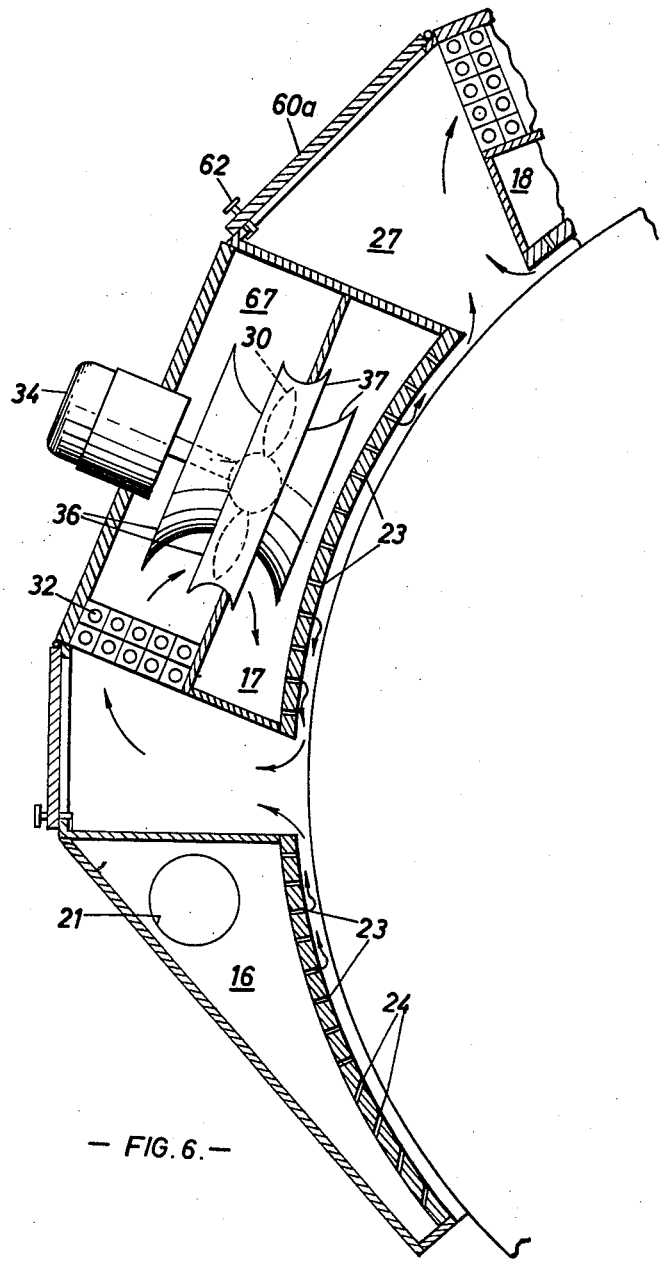

In the drawings:

FIG. 1 is a diagrammatic vertical cross section of a hood-like structure according to the invention of a machine glazing apparatus, FIG. 2 is a plan view of the apparatus, FIG. 3 is a cross section on the line III—III of FIG. 1, FIG. 4 is a developed detailed view generally in the direction of the arrow IV of FIG. 1, FIG. 5 is a perspective view of the hood-like structure, and FIG. 6 is an enlarged detail from FIG. 1 and is a section on the line VI—VI of FIG. 2.

As stated above, a disadvantage of a known hoodlike structure for the treatment of materials, more particularly for use in machine glazing apparatus, lies in the large amount of ducting which it had previously been thought was necessary. In this known apparatus the ducting leads to a bulky and expensive hood-like structure.

According to one feature of the present invention a hood-like structure for disposition around part of a drying cylinder, such as a machine glazing cylinder, comprises a succession of circumferentially spaced pressure chambers each having on its face for facing the cylinder a plurality of apertures or nozzles for the discharge of high velocity streams or jets of gaseous medium towards the cylinder, an exhaust chamber following each pressure chamber in the succession for withdrawing gaseous medium discharged from the pressure chamber which it follows and from the succeeding pressure chamber, where present, heated gaseous medium inlet means to the first pressure chamber in the succession, a fan associated with the or each pressure chamber other than said first for withdrawing gaseous medium from the exhaust chamber following the preceding pressure chamber and supplying the gaseous medium to the pressure chamber with which the fan is associated, heating means for heating gaseous medium so withdrawn and supplied, and gaseous medium outlet means from the last exhaust chamber in the succession.

The number of pressure chambers may be as little as 2 but may be 3, 4 or more depending upon the diameter of the cylinder.

If desired, an auxiliary pressure chamber, fan and heating means can be provided beyond the last exhaust chamber in the succession, which auxiliary pressure chamber has a plurality of apertures or nozzles similar to those of the pressure chambers in the succession.

Gaseous medium discharged from the apertures or nozzles of a pressure chamber generally flows in all directions after discharge. In particular some of the gaseous medium discharged from one pressure chamber returns to the exhaust chamber associated with the preceding pressure chamber and some is picked up by the exhaust chamber associated with said one pressure chamber. Side ducts are preferably provided at the sides of each pressure chamber for picking up gaseous medium which flows axially of the cylinder. The side ducts may be connected to the associated exhaust chamber only but may alternatively be continuous so as to interconnect all the exhaust chambers in the succession. A consequence of the use of the present invention is that heated gaseous medium can be introduced at one end of the hood-like structure and gaseous medium can be withdrawn at the other end, the medium thus passing from one end to the other successively through each of the pressure chambers. A portion of the gaseous medium will pass through each pressure chamber only once but the portion of the heated gaseous medium which is discharged through the nozzles or apertures of one pressure chamber and which is withdrawn by the preceding exhaust chamber will be recirculated through said one pressure chamber. Hence the gaseous medium passes through the succession of pressure chambers whilst being partly recirculated through each pressure chamber.

The first few apertures or nozzles in the first pressure chamber of the succession and the last few apertures or nozzles in the auxiliary pressure chamber if provided are preferably inclined or otherwise adapted to direct heated gaseous medium inwardly of the hood so as to tend to prevent gaseous medium discharging into the outer atmosphere.

An inlet gaseous medium heater and fan may be associated with the gaseous medium inlet means to the first pressure chamber and heat exchange means may be provided for passing gaseous medium withdrawn through the gaseous medium outlet means in heat exchange with gaseous medium supplied to said gaseous medium inlet heater. An exhaust fan may be associated with the gaseous medium outlet means for withdrawing gaseous medium from the last exhaust chamber of the succession.

The invention may be associated with a drying cylinder in such a manner that the direction of the succession of pressure chambers is the direction of rotation of the cylinder. Thus, the fresh heated gaseous medium supplied through the inlet means has a minimum humidity where material to be dried is wettest. In this way a maximum initial drying rate can be obtained.

As also stated above, another disadvantage of the known apparatus is that torn paper is difficult to remove and represents a hazard.

Thus according to another feature of the present invention a hood-like structure for disposition around part of a drying cylinder, such as a machine glazing cylinder, comprises a succession of circumferentially spaced pressure chambers each having on its face for facing the cylinder a plurality of apertures or nozzles for the discharge of high velocity streams or jets of gaseous medium towards the cylinder, means for supplying heated gaseous medium to said pressure chambers, and exhaust chambers between the pressure chambers, for the withdrawal of gaseous medium discharged therefrom, said exhaust chambers extending from the surface of the cylinder to the outside periphery of the structure, said structure having movable peripheral panels permitting ready access to said exhaust chambers.

The movable panels may be fastened in place by light spring catches. If a breakage of the material being heated occurs material most readily collects in the exhaust chambers and forces these panels open against the spring catches. This reduces the risk of the material jamming if a break should occur. The absence of suction holes beneath the pressure chambers reduces the risk of paper, particularly torn paper, lifting from the surface of the cylinder whilst beneath the pressure chambers.

Referring now to the drawings and more particularly to FIG. 1, paper 10 to be dried passes over a roller 11 and is pressed on to a machine glazing cylinder 12 by means of pressure rollers 13 and 14. The material then passes underneath a hood-like structure according to the invention and indicated generally at 15 and is led off the cylinder 12 over a roller 25. The hood-like structure 15 comprises, in the embodiment illustrated, five pressure chambers indicated at 16, 17, 18, 19 and 20, the pressure chambers 16 to 19 forming a succession of four pressure chambers and the pressure chamber 20 being an auxiliary pressure chamber. Exhaust chambers 26, 27, 28 and 29 are formed between the pressure chambers and are associated with the pressure chambers 16, 17, 18 and 19 respectively. Each of the pressure chambers has in its face facing the cylinder a plurality of apertures or nozzles 23 for the discharge of heated gaseous medium on to paper on the cylinder 12. The first pressure chamber 16 of the succession has some apertures or nozzles 24 which are inclined so as to direct the heated air inwardly of the hood-like structure 15 as also has the auxiliary pressure chamber 20. The first pressure chamber 16 of the succession has a heated air inlet 21 and the last exhaust chamber 29 of the succession has an air outlet 22. Disposed outside each of the pressure chambers 17, 18, 19 and 20 is a supply chamber 67, 68, 69 or 70 respectively. As can be appreciated more readily from FIG. 6, each of the supply chambers 67, 68, 69 and 70 is in communication with the preceding exhaust chamber 26, 27, 28 or 29 respectively via a heater 32 or 33, which extends substantially the full width of the structure 15. A convenient form of heater comprises steam pipes, preferably finned to assist in heat transfer. A fan 30 or 31 is associated with each of the pressure chambers 17, 18, 19 and 20 and is disposed between the pressure chambers and the corresponding supply chambers. Electric motors 34 or 35 are provided for driving the fans, the motor 35 driving the fan 31 associated with the auxiliary pressure chamber 20, which fan 31 has approximately half the capacity of the fans 30.

Each pressure chamber assembly, comprising a pressure chamber 17, 18, 19 or 20, a supply chamber 67, 68, 69 or 70, a heater 32 or 33, a fan 30 or 31 and a motor 34 or 35, is different from pressure chamber assemblies of known apparatus for machine glazing paper in that the inlet side of the fan is the side of the fan remote from the pressure chamber and the cylinder and directs the air into the pressure chamber in a direction towards the cylinder. In the known construction the fan draws in air in a direction away from the cylinder and supplies it to ducting which in turn supplies the air to the pressure chambers. By placing a fan, particularly an axial flow fan, directly between the supply chamber and the pressure chamber, ducting has been eliminated from the present invention. This enables the pressure chamber assembly as above described to be manufactured very compactly and at much lower cost than known pressure chamber assemblies. The particular shape of fan inlet 36 and diffuser 37 which is associated with the axial flow fans, as illustrated in the drawings, further enables the outer dimensions of the structure 15 to be reduced.

FIG. 2 illustrates an inlet air heater 40 and fan 41 associated with the heated air inlet 21 of the structure 15. Intermediate heat transfer fluid such as water supplied from a tank 42 is passed in heat exchange with exhaust air from the air outlet 22 in the heat exchanger 43 and is pumped to the heat exchanger 44 by pump 45 to preheat incoming inlet air before it passes through the heater 40. An exhaust fan 46 is conveniently provided after the heat exchanger 43 for withdrawing air from the exhaust chamber 29. The heater 40 may be a live steam heater and the provision of the heat exchangers 43 and 44 may save up to a third or more of the steam consumption. Of course, efficient heat exchange could equally well be obtained by passing the inlet and exhaust air immediately in heat exchange with one another without the use of an intermediate fluid, but the provision of the intermediate fluid may lead to a particularly compact design since only small bore pipes are needed for transferring the water between the heaters 43 and 44 which may be a considerable distance apart.

The cross section illustrated in FIG. 3 shows side ducts 50 and 51 which connect with an exhaust chamber 26, 27, 28 or 29. FIG. 3 illustrates a steam heater 32 having a steam inlet 54 and a drain 55. The heater 32 extends the full width of the structure 15 whereas the pressure chamber 19 only extends over the majority of the width of the cylinder 12. This permits the ducts 50 and 51 to be quite substantial in size. As can be seen from FIG. 5, these ducts are provided with doors 61 at their sides 52 and 53 for access to the surface of the cylinder.

FIG. 4 better illustrates the side ducts 50 and 51 which interconnect the exhaust chambers 26 and 27. The ducts 50 and 51 may alternatively be provided with partitions 57 and 58 so as to divide the ducts into portions each of which opens into one exhaust chamber only. In this case, air which is discharged from the apertures or nozzles 23 in the pressure chamber 17 and thereafter travels axially of the cylinder 12 is picked up by a portion of each of the ducts 50 and 51 and is led to the exhaust chamber 27 so as to be supplied to the next pressure chamber of the succession. Without the partitions 57 and 58 a greater proportion of the air may be recirculated through each pressure chamber.

Referring back again to FIG. 1, the exhaust chambers may be provided with spring loaded panels such as the panel 60 of the exhaust chamber 27. If a break should occur in the paper on the cylinder 12 this paper may pile up in the exhaust chamber 27 and force the panel 60 to open to its position 60' (shown in broken lines) against the force of spring catches. This may prevent the paper piling up between the pressure chambers and it also facilitates the removal of torn paper.

However, as illustrated in FIG. 5, the panels at the exterior of the exhaust chambers can be in the form of a plurality of trap doors 60a which are normally held closed by means of hand latches 62, or the like, which permit the trap doors to be opened without the use of tools. Each exhaust chamber as seen in FIG. 5 has at one side of the structure 15 a lamp 63, and at the other side a transparent inspection panel 64. This enables the interior of each exhaust chamber to be inspected at any time during normal running of the glazing machine in order to see whether there is any build-up of paper in any of the exhaust chambers. Additional access to the exhaust chambers may be obtained through side doors 65.

As can clearly be seen in FIG. 5, the trap doors in the panels 60 permit access through the exhaust chambers right to the outer surface of the drum 12 or to the web of paper thereon. Since there are no suction holes in the inner faces of the pressure chambers there is a much reduced risk of the web leaving the surface of the cylinder whilst it is under the pressure chambers. The only place where it can readily leave the surface of the cylinder if the web should become torn or broken is at the exhaust chambers and the trap doors 60a give ready access to these chambers so that such torn or broken paper can be quickly removed without necessarily shutting down the machine. Even if it should prove necessary to shut down the machine the shut-down need only last for a very short period, as the torn paper can be removed very quickly.

The lead-on and lead-off rollers associated with the cylinder 12 have been omitted from FIG. 5 for the sake of clarity.

In a hood-like structure according to the present invention, the fresh air is introduced at one point. This eliminates the necessity for ducting for supplying make-up air to each section of the hood-like structure as in known apparatus. In the present invention the temperature and quantity of the fresh inlet air is variable independently of the circulation through each of the pressure chambers 17, 18, 19 and 20.

A proportion of the air is recirculated through each heater and pressure chamber so that advantages (e.g. economy of operation) of recirculating through a substantially enclosed endless path may substantially be retained. The heat supplied by the heater 40 may be approximately half the total heat supplied to the air. The inlet air temperature in the pressure chamber 16 may for example lie within the range of 220° F. to 300° F. according to the steam pressure if steam heating is used. The exhaust air temperature in the exhaust chamber 29 may lie within the range of 190° F. to 270° F. The cylinder 12 may be heated from inside by any conventional method, the heating means for this purpose being for the sake of clarity omitted from the drawings.

A further advantage obtained by not having any suction holes in the faces of the pressure chambers is that threading of the paper may be facilitated. The streams or jets of heated air tend to hold the paper on to the surface of the cylinder until it sticks and there is no immediate suction tending to have the opposite effect.

The advantage of having the inlet air steam heater 40 and fan 41 remote from the hood is that the hood can be reduced in size thereby saving space adjacent the cylinder 12. Moreover, an axial flow fan 41 can be used in the air inlet 21 which eliminates power losses that would occur in additional ducting which would otherwise have to be used.

I claim:

1. In material treatment apparatus including a rotatable material treatment cylinder about which is passed a length of material to be treated: a treatment hood disposed about said cylinder and having an outer peripheral wall and side walls extending from the outer peripheral wall to adjacent the ends of the cylinder; a plurality of partitions in said hood each extending transversely of the direction of material travel, said partitions dividing the interior of the hood into a succession of alternately arranged circumferentially spaced pressure chambers and exhaust chambers; an arcuate facing secured to the pair of partitions at opposite sides of each pressure chamber in the succession, said facings facing the cylinder and having a plurality of apertures for the discharge of high velocity streams of gaseous medium towards the cylinder from the pressure chambers, each of said exhaust chambers serving for withdrawing gaseous medium discharged from the pressure chamber which it follows and from the succeeding pressure chamber, where present; heated gaseous medium inlet means to the first pressure chamber in the succession; fan means associated with each pressure chamber other than said first for withdrawing gaseous medium from the preceding exhaust chamber and supplying the gaseous medium so withdrawn to that pressure chamber to which the fan means is associated; and gaseous medium outlet means from the last exhaust chamber in the succession.

2. In material treatment apparatus including a rotatable material treatment cylinder about which is passed a length of material to be treated: a treatment hood disposed about said cylinder and having an outer peripheral wall and side walls extending from the outer peripheral wall to adjacent the ends of the cylinder; a plurality of partitions in said hood each extending transversely of the direction of material travel, said partitions dividing the interior of the hood into a succession of circumferentially spaced pressure chambers and exhaust chambers between each pair of adjacent pressure chambers; an arcuate facing secured to the pair of partitions at opposite sides of each pressure chamber in the succession, said facings facing the cylinder and having a plurality of apertures for the discharge of high velocity streams of gaseous medium towards the cylinder from the pressure chambers, each of said exhaust chambers serving for withdrawing gaseous medium discharged from the pressure chamber which it follows and from the succeeding pressure chamber; heated gaseous medium inlet means to the first pressure chamber in the succession; fan means associated with each pressure chamber other than said first for withdrawing gaseous medium from the preceding exhaust chamber and supplying the gaseous medium so withdrawn to that pressure chamber to which the fan means is associated, the fan means associated with the last pressure chamber in the succession being approximately of half the capacity of the fan means associated with the other pressure chambers; and gaseous medium outlet means from the last exhaust chamber in the succession.

3. In material treatment apparatus including a rotatable material treatment cylinder about which is passed a length of material to be treated: the combination comprising a treatment hood disposed about said cylinder and having an outer peripheral wall and side walls extending from the outer peripheral wall to adjacent the ends of the cylinder; a plurality of partitions in said hood each extending transversely of the direction of material travel, said partitions dividing the interior of the hood into a succession of alternately arranged circumferentially spaced pressure chambers and exhaust chambers; an arcuate facing secured to the pair of partitions at opposite sides of each pressure chamber in the succession, said facings facing the cylinder and having a plurality of apertures for the discharge of high velocity streams of gaseous medium towards the cylinder from the pressure chambers, said exhaust chambers serving for withdrawing gaseous medium discharged from the pressure chambers; a heated gaseous medium inlet to the first pressure chamber in the succession; separate fan means associated with each pressure chamber other than said first for withdrawing gaseous medium from the preceding exhaust chamber and supplying the gaseous medium so withdrawn to that pressure chamber to which the fan means is associated; separate heating means for heating gaseous medium so withdrawn and supplied; and a gaseous medium outlet from the last exhaust chamber in the succession.

4. The combination according to claim 3 in which no exhaust chamber follows the last pressure chamber in the succession and in which the fan means and heating means associated with the last pressure chamber in the succession are approximately on half the capacity of the fan means and heating means associated with the other pressure chambers.

5. The combination according to claim 3 further comprising supply ducting connected to said heated gaseous medium inlet; a gaseous medium supply fan in said supply ducting; heating means for heating gaseous medium supplied through said supply ducting; and exhaust ducting connected to said gaseous medium outlet.

6. The combination according to claim 5 further comprising heat exchanging means for transferring some of the residual heat in spent gaseous medium in said exhaust ducting to fresh gaseous medium in said supply ducting.

7. The combination according to claim 6 in which said heat exchanging means comprises two separate heat exchangers one path of each of which includes said supply and exhaust ducting respectively and the other paths of each of which are interconnected for passing intermediate fluid in heat exchange with said spent and fresh gaseous medium to effect said heat transfer.

8. In material treatment apparatus including a rotatable material treatment cylinder about which is passed a length of material to be treated: a treatment hood disposed about said cylinder and having an outer peripheral wall and side walls extending from the outer peripheral wall to adjacent the ends of the cylinder; a plurality of partitions in said hood each extending transversely of the direction of material travel, said partitions dividing the interior of the hood into a succession of alternately arranged circumferentially spaced pressure chambers and exhaust chambers; an arcuate facing secured to the pair of partitions at opposite sides of each pressure chamber in the succession, said facings facing the cylinder and having a plurality of apertures for the discharge of high velocity streams of gaseous medium towards the cylinder from the pressure chambers, each of said exhaust chambers serving for withdrawing gaseous medium discharged from the pressure chamber which it follows and from the succeeding pressure chamber, a baffle isolating each pressure chamber except the first in the succession from the outer peripheral wall of the hood to define a supply chamber outside each pressure chamber except said first, each partition separating an exhaust chamber from a succeeding pressure chamber extending short of the outer peripheral wall to provide an entrance to each supply chamber from the preceding exhaust chamber and each baffle having an opening therein; heated gaseous medium inlet means to the first pressure chamber in the succession; fan means associated with each of said baffle openings for supplying gaseous medium therethrough from the supply chambers to the associated pressure chambers; and gaseous medium outlet means from the last exhaust chamber in the succession.

9. The treatment hood according to claim 8 further comprising gaseous medium heating means disposed at the entrance to each supply chamber from the preceding exhaust chamber.

10. The treatment hood according to claim 9 wherein said heating means comprises finned steam pipes.

11. The treatment hood according to claim 8 wherein each of said fan means comprises an axial flow fan disposed with its axis perpendicular to said baffle and with its inlet in its supply chamber and its outlet in its pressure chamber.

12. In material treatment apparatus including a rotatable material treatment cylinder about which is passed a length of material to be treated: the combination comprising a treatment hood disposed about said cylinder and having an outer peripheral wall and side walls extending from the outer peripheral wall to adjacent the ends of the cylinder; a plurality of partitions in said hood each extending transversely of the direction of material travel, said partitions dividing the interior of the hood into a succession of alternately arranged circumferentially spaced pressure chambers and exhaust chambers; an arcuate facing secured to the pairs of partitions at opposite sides of each pressure chamber in the succession, said facings facing the cylinder and having a plurality of apertures for the discharge of high velocity streams of gaseous medium towards the cylinder from the pressure chambers, said exhaust chambers serving for withdrawing gaseous medium discharged from the pressure chambers; a heated gaseous medium inlet to the first pressure chamber in the succession; supply ducting connected to said heated gaseous medium inlet; gaseous medium supply fan means in said supply ducting; heating means for heating gaseous medium supplied through said supply ducting; circulating fan means associated with each pressure chamber other than said first for withdrawing gaseous medium from the preceding exhaust chamber and supplying the gaseous medium so withdrawn to that pressure chamber to which the circulating fan means is associated; a gaseous medium outlet from the last exhaust chamber in the succession; and exhaust ducting connected to said gaseous medium outlet means.

13. The combination according to claim 12 further comprising heat exchanging means for transferring some of the residual heat in spent gaseous medium in said exhaust ducting to fresh gaseous medium in said supply ducting.

14. The combination according to claim 13 wherein said heat exchanging means comprises two separate heat exchangers one path of each of which includes said supply and exhaust ducting respectively and the other paths of each of which are interconnected for passing intermediate fluid in heat exchange with said spent and fresh gaseous medium to effect said heat transfer.

15. In material treatment apparatus including a rotatable treatment cylinder about which is passed a length of material to be treated: a treatment hood disposed about said cylinder and having an outer peripheral wall and side walls extending from the outer peripheral wall to adjacent the ends of the cylinder; a plurality of partitions in said hood each extending transversely of the direction of the material travel, said partitions dividing the interior of the hood into a succession of alternately arranged circumferentially spaced pressure chambers and exhaust chambers; an arcuate facing secured to the pair of partitions at opposite sides of each pressure chamber in the succession, said facings facing the cylinder and having a plurality of apertures for the discharge of high velocity streams of gaseous medium towards the cylinder from the pressure chambers; means for supplying heated gaseous medium to said pressure chambers for said discharge therefrom, each of said exhaust chambers extending from the surface of the cylinder to said outer peripheral wall of the hood and serving for the withdrawal of gaseous medium discharged from the pressure chamber which it follows and from the succeeding pressure chamber, where present; and movable peripheral panels in said outer peripheral wall of said hood giving access through each of said exhaust chambers to the outer surface of the cylinder and the material thereabout.

16. In material treatment apparatus including a rotatable treatment cylinder about which is passed a length of material to be treated: a treatment hood disposed about said cylinder and having an outer peripheral wall and side walls extending from the outer peripheral wall to adjacent the ends of the cylinder; a plurality of pairs of substantially parallel partitions in said hood each extending transversely of the direction of the material travel, said partitions dividing the interior of the hood into a succession of circumferentially spaced-apart pressure chambers between the two partitions of each said pair and exhaust chambers between the pressure chambers; an arcuate facing secured to each said pair of partitions, said facings facing the cylinder and having a plurality of apertures for the discharge of high velocity streams of gaseous medium towards the cylinder from the pressure chambers; means for supplying heated gaseous medium to said pressure chambers for said discharge therefrom, each of said exhaust chambers extending divergently from the surface of the cylinder to said outer peripheral wall of the hood and serving for the withdrawal of gaseous medium discharged from the pressure chamber which follows and from the succeeding pressure chamber, where present; and movable peripheral panels in said outer peripheral wall of said hood giving access through each of said exhaust chambers to the outer surface of the cylinder and the material thereabout.

17. A hood according to claim 16 wherein said movable peripheral panels comprise doors hinged to said hood.

18. A hood according to claim 16 having a window in the side wall at one end of each said exhaust chamber and a lamp at the other end of each said exhaust chamber.

19. For disposition about a rotatable drying cylinder of a paper making machine, the combination comprising: a succession of circumferentially spaced-apart casings defining pressure chambers each having an arcuate face for facing the cylinder and a plurality of nozzle openings in said arcuate face for the discharge of high velocity streams of gaseous medium towards paper on the outer surface of the cylinder; means defining a gaseous medium supply chamber at the side of each pressure chamber, except the first in the succession, remote from said arcuate face; means enclosing the space between each adjacent pair of casings together with the associated supply chamber defining means, where present, to define an exhaust chamber between each adjacent pair of pressure chambers, said exhaust chambers serving for the withdrawal of gaseous medium discharged from the pressure chambers and being in direct communication with the immediately following supply chamber in the succession; a heated gaseous medium inlet to the first casing in the succession; a fan associated with an opening in each casing, other than said first, between the pressure chamber defined thereby and the associated supply chamber for supplying gaseous medium from the supply chamber to its associated pressure chamber; a spent gaseous medium outlet in the last enclosing means in the succession; and movable peripheral panels in said enclosing means providing ready access through said exhaust chambers to the outer surface of the cylinder and the paper thereon.

20. The combination according to claim 19 in which said exhaust chambers are divergent from their cylinder side outwardly.

21. In a drying section of a paper making machine having a rotatable drying cylinder: paper drying apparatus comprising a drying hood disposed about said cylinder and having an outer peripheral wall and side walls extending from the outer peripheral wall to adjacent the ends of the cylinder; a plurality of partitions in said hood each extending transversely of the direction of paper travel, said partitions dividing the interior of the hood into a succession of alternately arranged circumferentially spaced pressure chambers and exhaust chambers; an arcuate facing secured to the pair of partitions at opposite sides of each pressure chamber in the succession, said facings facing the cylinder and having a plurality of apertures for the discharge of high velocity streams of gaseous medium towards the cylinder from the pressure chambers, each of said exhaust chambers extending divergently from the outer surface of the cylinder to the outer peripheral wall of the hood and serving for withdrawing gaseous medium discharged from the pressure chamber which it follows and from the succeeding pressure chamber, where present; movable peripheral panels in said outer peripheral wall of said hood giving access to within each exhaust chamber; a baffle isolating each pressure chamber except the first in the successison from the outer peripheral wall of the hood to define a supply chamber outside each pressure chamber except said first, each of said partitions separating an exhaust chamber from a succeeding pressure chamber extending short of the outer peripheral wall to provide an entrance to each supply chamber from the preceding exhaust chamber and each baffle having an opening therein; a heated gaseous medium inlet to the first pressure chamber in the succession; a gaseous medium outlet from the last exhaust chcamber in the succession; supply ducting connected to said heated gaseous medium inlet; fan means in said supply ducting; first and second heat exchangers each having two heat exchange paths in heat exchange relationship with one another, said supply ducting including one path of said first heat exchanger and said exhaust ducting including one path of said second heat exchanger; means interconnecting the other paths of said heat exchangers for the circulation of an intermediate heat transfer fluid therebetween for transferring residual heat from spent gaseous medium in said exhaust ducting to fresh gaseous medium in said supply ducting; means for imparting additional heat to said fresh gaseous medium; and fan means associated with each of said baffle openings for supplying gaseous medium therethrough from the supply chambers to the associated pressure chambers.

22. Drying apparatus according to claim 21 further comprising gaseous medium heating means disposed in the entrance to each supply chamber from the preceding exhaust chamber.

23. In material treatment apparatus including a rotatable treatment cylinder about which is passed a length of material to be treated: a treatment hood disposed about said cylinder and having an outer peripheral wall and side walls extending from the outer peripheral wall to adjacent the ends of the cylinder; a plurality of pairs of substantially parallel partitions in said hood each extending transversely of the direction of the material travel, said partitions dividing the interior of the hood into a succession of circumferentially spaced-apart pressure chambers between the two partitions of each said pair and exhaust chambers between the pressure chambers; side ducts at opposite ends of said pressure chambers and exhaust chambers and of substantially the full circumferential length of said hood, said side ducts communicating with said exhaust chambers and with the ends of the cylinder;

an arcuate facing secured to each said pair of partitions, said facings facing the cylinder and having a plurality of apertures for the discharge of high velocity streams of gaseous medium towards the cylinder from the pressure chambers; means for supplying heated gaseous medium to said pressure chambers for said discharge therefrom, each of said exhaust chambers extending divergently from the surface of the cylinder to said outer peripheral wall of the hood and serving for the withdrawal of gaseous medium discharged from the pressure chamber which follows and from the succeeding pressure chamber, where present; and movable peripheral panels in said outer peripheral wall of said hood giving access through each of said exhaust chambers to the outer surface of the cylinder and the material thereabout.

24. A hood according to claim 23 including movable panels in said side ducts giving access thereinto.

References Cited in the file of this patent

FOREIGN PATENTS

| | | |
|---|---|---|
| 578,399 | Germany | June 13, 1933 |
| 1,056,887 | France | Mar. 3, 1954 |
| 1,144,533 | France | Oct. 15, 1957 |